United States Patent
Sarkar et al.

(10) Patent No.: US 12,211,487 B1
(45) Date of Patent: Jan. 28, 2025

(54) SYSTEMS AND METHODS FOR ACCESSIBLE WEBSITES AND/OR APPLICATIONS FOR PEOPLE WITH DISABILITIES

(71) Applicant: Morgan Stanley Services Group Inc., New York, NY (US)

(72) Inventors: Aratrika Sarkar, Jersey City, NJ (US); Ayyapparaj Radhakrishnan Ganesan, Karnataka (IN); Mayank Jain, Madhya Pradesh (IN); Mehak Mehta, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/416,084

(22) Filed: Jan. 18, 2024

(51) Int. Cl.
| | |
|---|---|
| *G10L 15/06* | (2013.01) |
| *G09B 21/00* | (2006.01) |
| *G10L 15/01* | (2013.01) |
| *G10L 15/18* | (2013.01) |
| *G10L 15/22* | (2006.01) |
| *G10L 15/30* | (2013.01) |
| *G10L 25/18* | (2013.01) |
| *G10L 25/78* | (2013.01) |
| *G10L 25/84* | (2013.01) |

(52) U.S. Cl.
CPC ............ *G10L 15/063* (2013.01); *G09B 21/00* (2013.01); *G10L 15/01* (2013.01); *G10L 15/1822* (2013.01); *G10L 15/22* (2013.01); *G10L 15/30* (2013.01); *G10L 25/18* (2013.01); *G10L 25/84* (2013.01); *G10L 2025/783* (2013.01)

(58) Field of Classification Search
None
See application file for complete search history.

(56) References Cited

U.S. PATENT DOCUMENTS

| | | | |
|---|---|---|---|
| 7,240,279 B1 * | 7/2007 | Chartier ............... | G06F 40/143 715/260 |
| 11,055,208 B1 * | 7/2021 | Pandurangarao ... | G06F 11/3692 |
| 2002/0103914 A1 * | 8/2002 | Dutta .................... | H04L 67/306 709/217 |
| 2002/0138616 A1 * | 9/2002 | Basson ............... | G07F 17/0014 709/225 |
| 2006/0195819 A1 * | 8/2006 | Chory ................... | G06F 16/958 717/117 |
| 2010/0131797 A1 * | 5/2010 | Ganesh ................. | G06F 11/34 714/21 |
| 2012/0254723 A1 * | 10/2012 | Kasa .................... | G06F 40/226 715/234 |

(Continued)

FOREIGN PATENT DOCUMENTS

KR   20220103477 A  *  7/2022

*Primary Examiner* — Jonathan C Kim
(74) *Attorney, Agent, or Firm* — PEARL COHEN ZEDEK LATZER BARATZ LLP

(57) ABSTRACT

A system and method for creating accessibility of any website or application for people with sight, hearing or speech disabilities. The system and method can include receiving input of the website or the application to be accessed and an indicator as to specific disabilities a user, scoring the website or the application for its accessibility based on the specific disabilities of the user, and if the score is below a threshold, determining an alternative form for the input of the website or the application to accommodate the specific disabilities of the user.

12 Claims, 10 Drawing Sheets

(56) References Cited

U.S. PATENT DOCUMENTS

| | | | |
|---|---|---|---|
| 2014/0380238 A1* | 12/2014 | Sahasrabudhe | G06F 3/0482 715/810 |
| 2015/0019214 A1* | 1/2015 | Wang | G06N 3/02 704/232 |
| 2015/0088508 A1* | 3/2015 | Bharadwaj | G10L 15/063 704/237 |
| 2015/0127665 A1* | 5/2015 | Keohane | G06F 16/955 707/751 |
| 2015/0287408 A1* | 10/2015 | Svendsen | G10L 15/26 704/235 |
| 2016/0261475 A1* | 9/2016 | Jadhav | G06F 16/95 |
| 2017/0206914 A1* | 7/2017 | Engelke | G10L 21/10 |
| 2018/0174576 A1* | 6/2018 | Soltau | G10L 15/02 |
| 2018/0301142 A1* | 10/2018 | Gunn | G10L 17/20 |
| 2019/0354913 A1* | 11/2019 | Venkadesavaralu | H04L 63/1433 |
| 2020/0035224 A1* | 1/2020 | Ward | G10L 15/22 |
| 2020/0294489 A1* | 9/2020 | Ding | G10L 15/22 |
| 2020/0327884 A1* | 10/2020 | Bui | G06N 3/08 |
| 2021/0081165 A1* | 3/2021 | Deshmukh | G06N 20/00 |
| 2021/0097159 A1* | 4/2021 | Wang | G10L 25/24 |
| 2021/0182355 A1* | 6/2021 | Wiley | G06F 16/957 |
| 2021/0342522 A1* | 11/2021 | Khorana | H04L 67/561 |
| 2022/0083406 A1* | 3/2022 | Shushan | G06F 16/9532 |
| 2022/0084438 A1* | 3/2022 | Bansal | G06F 16/957 |
| 2022/0129123 A1* | 4/2022 | Nair | G06F 8/38 |
| 2022/0231999 A1* | 7/2022 | Dasgupta | G06F 9/547 |
| 2022/0262355 A1* | 8/2022 | Lai | G10L 15/065 |
| 2022/0277036 A1* | 9/2022 | Dhiman | G06F 16/436 |
| 2022/0366131 A1* | 11/2022 | Ekron | G06F 16/986 |
| 2022/0383887 A1* | 12/2022 | Wang | G10L 25/51 |
| 2023/0063547 A1* | 3/2023 | Barnes | G06T 19/003 |
| 2023/0117535 A1* | 4/2023 | Apsingekar | G10L 15/22 704/232 |
| 2023/0178065 A1* | 6/2023 | Murugesan | G10L 21/0364 704/260 |

\* cited by examiner

|  |  |
|---|---|
| accentColor | Grey |
| isBWImg |  |
| isBWImg |  |
| image Type |  |
| clipArtType | 0 |
| lineDrawing Type | 0 |

| tags | | |
|---|---|---|
| name | confidence | |
| grass | 0.9957543611526489 | |
| dog | 0.9939157366752625 | |
| mammal | 0.9928357005119324 | |
| animal | 0.9918001890182495 | |
| dog breed | 0.9890419840812683 | |
| pet | 0.9746035337448812 | |
| outdoor | 0.9692417383193970 | |
| companion dog | 0.9067313671112060 | |
| small greek domestic dog | 0.8965125083923340 | |
| golden retriever | 0.8877674937248230 | |
| labrador retriever | 0.8746423125267029 | |
| puppy | 0.8726040124893188 | |
| ancient dog breeds | 0.8508288860321045 | |
| field | 0.8017743825912476 | |
| retriever | 0.6837495564144290 | |
| brown | 0.6581968665122986 | |

| description | | | | | |
|---|---|---|---|---|---|
| tags | | | | | |
| grass | dog | outdoor | animal | mammal | laying | tan |

| captions | |
|---|---|
| text | confidence |
| a small dog in the grass | 0.443710505962371 | faces objects

FIG. 3D sign_language_to_text (Python)

iassist-cluster 4 letters list(string.ascii_letters)
5 print(list(map(lambda c: letters [c], result_indices)))

['w', 'e', 'l', 'c', 'o', 'n', 'e', 't', 'o', 'n', 'o', 'r', 'g', 'a', 'n', 's', 't', 'a', 'n', 'l', 'e', 'y']
Command took 0.06 seconds -- by aratrs@lab.morganstanley.com at 2/27/2022, 7:08:27 PM on iassist-cluster Cmd 37

1 predictions = model.predict(demo_validation_data)
2 predictions[0]
3 result_indices = list(np.argmax(predictions, axis=-1))
4 letters = list(string.ascii_letters)
5 print(list (map(lambda c: letters[c], result_indices)))

['w', 'e', 'l', 'c', 'o', 'n', 'e', 't', 'o', 'n', 'o', 'r', 'g', 'a', 'n', 's', 't', 'a', 'n', 'l', 'e', 'y']
Command took 0.06 seconds by aratrs@lab.morganstanley.com at 2/27/2022, 7:08:31 PM on iassist-cluster Cmd 38

1 list_text = list(map(lambda c: letters[c], result_indices))

Command took 0.01 seconds -- by aratrs@lab.morganstanley.com at 2/28/2022, 7:45:31 PM on iassist-cluster Cmd 39

1 final_text = " ".join(list_text)

Command took 0.02 seconds -- aratrs@lab.morganstanley.com at 2/28/2022, 7:54:05 PM on iassist-cluster Cmd 40

1 final_text

FIG. 3G

SYSTEMS AND METHODS FOR ACCESSIBLE WEBSITES AND/OR APPLICATIONS FOR PEOPLE WITH DISABILITIES

FIELD OF THE INVENTION

The invention relates generally to accessibility of online resources for people with disabilities. In particular, to accessibility to any website and/or application.

BACKGROUND

In America approximately 3.8 million adults are blind or have trouble seeing, 466 million people in the world have hearing and/or speech disabilities. Currently most computer applications and/or websites are not inclusive and do not have facilities for such people to use these sites.

Many content providers that provide content that is crucial for access to society provide such content through known entities. For example, YouTube®, Instagram®, and/or other social media sites or applications. Many applications and/or websites do not include audio to text or image to text options which can create inaccessibility of these applications and/or websites for people who are blind, hard of hearing and/or lack speech capabilities.

Therefore, it can be desirable to provide accessibility for any application and/or website for people who are blind, hard of hearing and/or lack speech capabilities.

SUMMARY OF THE INVENTION

One advantage of the invention can include an ability to provide accessibility for any application and/or website for people who are blind, hard of hearing and/or lack speech capabilities. Another advantage of the invention can include enabling differently abled people access to job portals, educational tools, and/or any online communities that they otherwise are not able to access. Another advantage of the invention can include applications increasing their WSG scoring by making their sites accessible to diversified users.

A method for creating accessibility of any website or application for people with sight, hearing or speech disabilities. The method can involve receiving, by a server, input of the website or the application to be accessed and an indicator as to specific disabilities a user of a device sending the input. The method can also involve parsing, by the server, html elements from the input. The method can also involve scoring, by the server, the website or the application for its accessibility based on the specific disabilities of the user. The method can also involve for a score that is below a threshold, determining, by the server, an alternative form for the input of the website or the application based on the specific disabilities of the user and a corresponding machine learning algorithm of a plurality of machine learning algorithms. The method can also involve adding, by the server, functionality to the input of the website or the application that enables the alternative form for the input on the website or the application. The method can also involve outputting, by the server, to the device of the user the input of the website or the application with the added functionality.

In some embodiments, the machine learning algorithm has a number of layers and a number of neurons in each layer that is based on a user defined input, a table input or any combination thereof. In some embodiments, the method involves determining the alternative form for the input further comprises converting audio to text, video to text, sign language to text, image to text, or any combination thereof.

In some embodiments, each of the plurality of machine learning algorithms corresponds to a particular form of input. In some embodiments, receiving also involves receiving via a browser extension.

In some embodiments, the audio to text further comprises i) collecting, by the processor, a predetermined duration of audio data having noise below a threshold and a transcript of the audio data, ii) processing, by the processor, the audio data such that it is in a labeled format, iii) training, by the processor, one model of the plurality of models with the audio data, wherein the one model is a baseline model, iv) evaluating, by the processor, the trained one model using an error rate metric, v) if the error rate metric is below a threshold, obtaining a new predetermine duration of audio data having noise below a threshold and a transcript of the audio data and proceeding back to step ii), vi) if the error rate metric is at or above the threshold, set the model as the model to use for audio to text. and. vii) for any input that is audio, translate the input from audio to text using the model.

In some embodiments, the scoring further comprises rescoring with the model set as the model to use for audio to text. In some embodiments, the method further involves determining, by the computing device, a revised score for the website or the application for its accessibility based on the specific disabilities of the user and the alternative form for the input; and if the score is below the threshold, continue to train the one model. In some embodiments, the method also involves processing, by the computing device, the audio data into a 2D Numpy array and Mel Spectrogram conversion.

A system for creating accessibility of any website or application for people with sight, hearing or speech disabilities, the system comprising a processor configured to receive input of the website or the application to be accessed and an indicator as to specific disabilities a user of a device sending the input. The processor is also configured to parse html elements from the input. The processor is also configured to score the website or the application for its accessibility based on the specific disabilities of the user. The processor is also configured to for a score that is below a threshold, determine an alternative form for the input of the website or the application based on the specific disabilities of the user and a corresponding machine learning algorithm of a plurality of machine learning algorithms/The processor is also configured to add functionality to the input of the website or the application that enables the alternative form for the input on the website or the application. The processor is also configured to output to the device of the user the input of the website or the application with the added functionality.

In some embodiments, the machine learning algorithm has a number of layers and a number of neurons in each layer that is based on a user defined input, a table input or any combination thereof. In some embodiments, determining the alternative form for the input also includes converting audio to text, video to text, sign language to text, image to text, or any combination thereof.

In some embodiments, each of the plurality of machine learning algorithms corresponds to a particular form of input. In some embodiments, receiving also includes receiving via a browser extension.

In some embodiments, converting the audio to text further cause the processor to i) collect a predetermined duration of audio data having noise below a threshold and a transcript of the audio data, ii) process the audio data such that it is in a labeled format, iii) train one model of the plurality of models with the audio data, wherein the one model is a baseline model, iv) evaluate the trained one model using an error rate metric, v) if the error rate metric is below a threshold, obtain a new predetermine duration of audio data having noise below a threshold and a transcript of the audio data and proceeding back to step ii), vi) if the error rate metric is at or above the threshold, set the model as the model to use for audio to text, and vii) for any input that is audio, translate the input from audio to text using the model.

In some embodiments, the scoring further comprises rescoring with the model set as the model to use for audio to text. In some embodiments, the processor is further configured to determine a revised score for the website or the application for its accessibility based on the specific disabilities of the user and the alternative form for the input, and if the score is below the threshold, continue to train the one model.

In some embodiments, the processor is further configured to process the audio data into a 2D Numpy array and Mel Spectrogram conversion.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 3D is an example of output including tags, captions, and corresponding confidence scores for the image, according to some embodiments of the invention.

FIG. 3G is an example of code used to convert the sign language to text, according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/ or circuits have not been described in detail so as not to obscure the invention.

Figure 1:
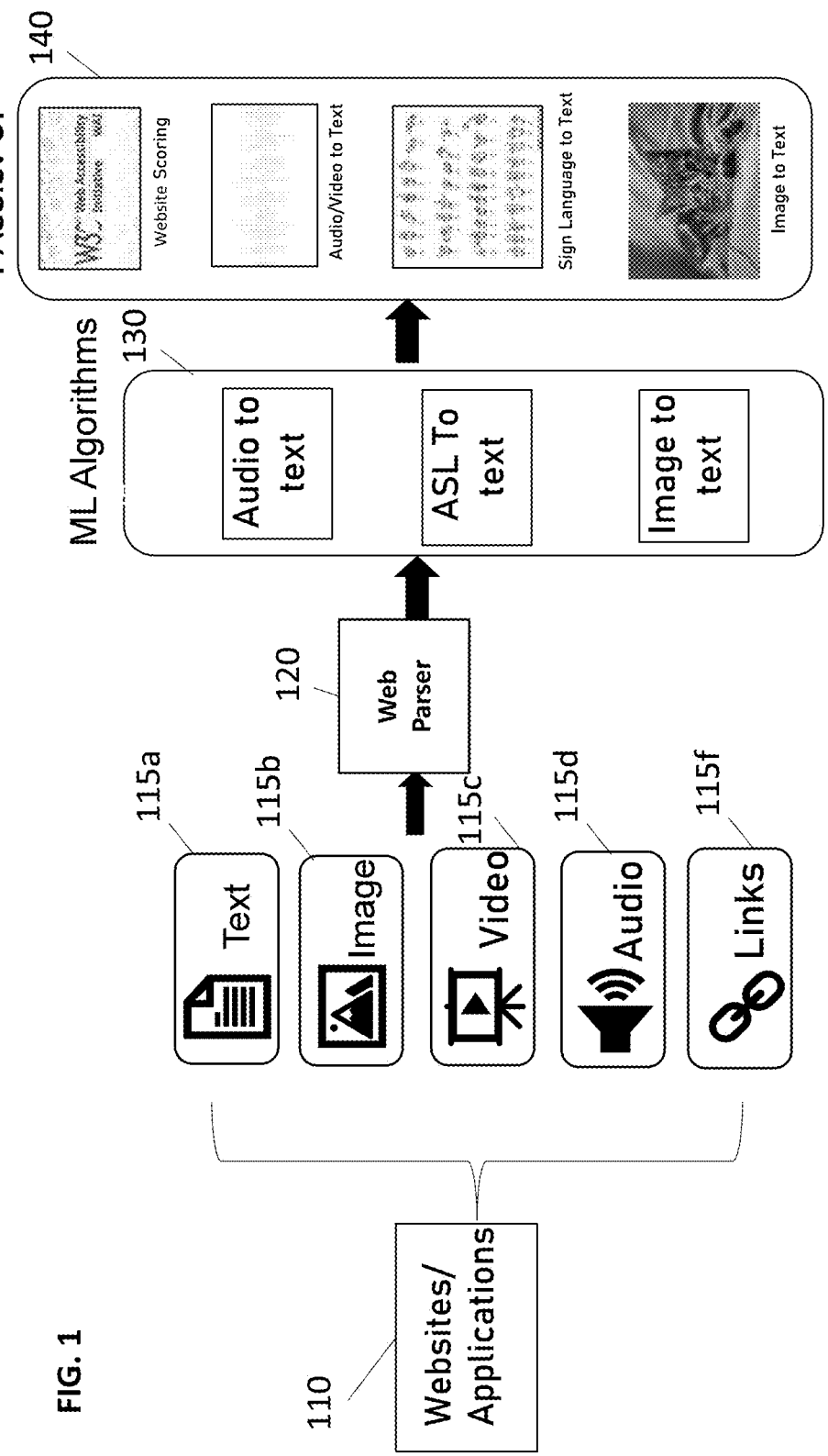
FIG. 1 is a diagram of a system architecture for creating accessibility of any website or application, according to some embodiments of the invention.

FIG. 1 is a diagram of a system 100 architecture for creating accessibility of any website or application, according to some embodiments of the invention.

The system 100 can include any device (not shown) that executes a website and/or application 110. The device can be a desktop computer, mobile device, tablet, laptop, smart watch and/or any device as is known in the art.

The website and/or application 110 can be any website and/or application as is known in the art. The website and/or application 110 be in the form of text 115a, image 115b, video 115c, audio 115d and/or links 115f, as is known in the art.

The website and/or applications 110 can be input to a web parser 120 that can parse HTML elements from the website. Images, audio and/or text in the HTML can be parsed. In some embodiments, the HTML can be parsed using Beautiful Soup. In some embodiments, HTML can be parsed using Fizzler, csquery and/or any tool as is known in the art to parse HTML.

The output of the web parser 120 (e.g., images, audio and/or text from the HTML elements) can be input to machine learning (ML) models 130. The ML models 130 can perform scoring. The ML models 130 can include an audio to text model, ASL to text model, and/or image to text model, and a scoring model (note shown). The scoring model can be based on WCAG guidelines and/or one or more ML algorithms. The ML models 130 (e.g., ML algorithms) can be neural network, convolutional neural networks, and/or any ML model as is known in the art.

The output of the ML models 130 can be transmitted to a display of a device of a user via an interface 140 such that. In some embodiments, the ML models 130 output allows the application to go from being inaccessible to accessible.

In some embodiments, the web parser 120 is on a first server and the ML models 130 are on a second server. In some embodiments, the web parser 120 and the ML models 130 are on the same server. In some embodiments, the ML models 130 are on the same server. In some embodiments, the ML models 130 are on different servers. In various embodiments, the ML models 130 are on any combination of servers.

Figure 2:
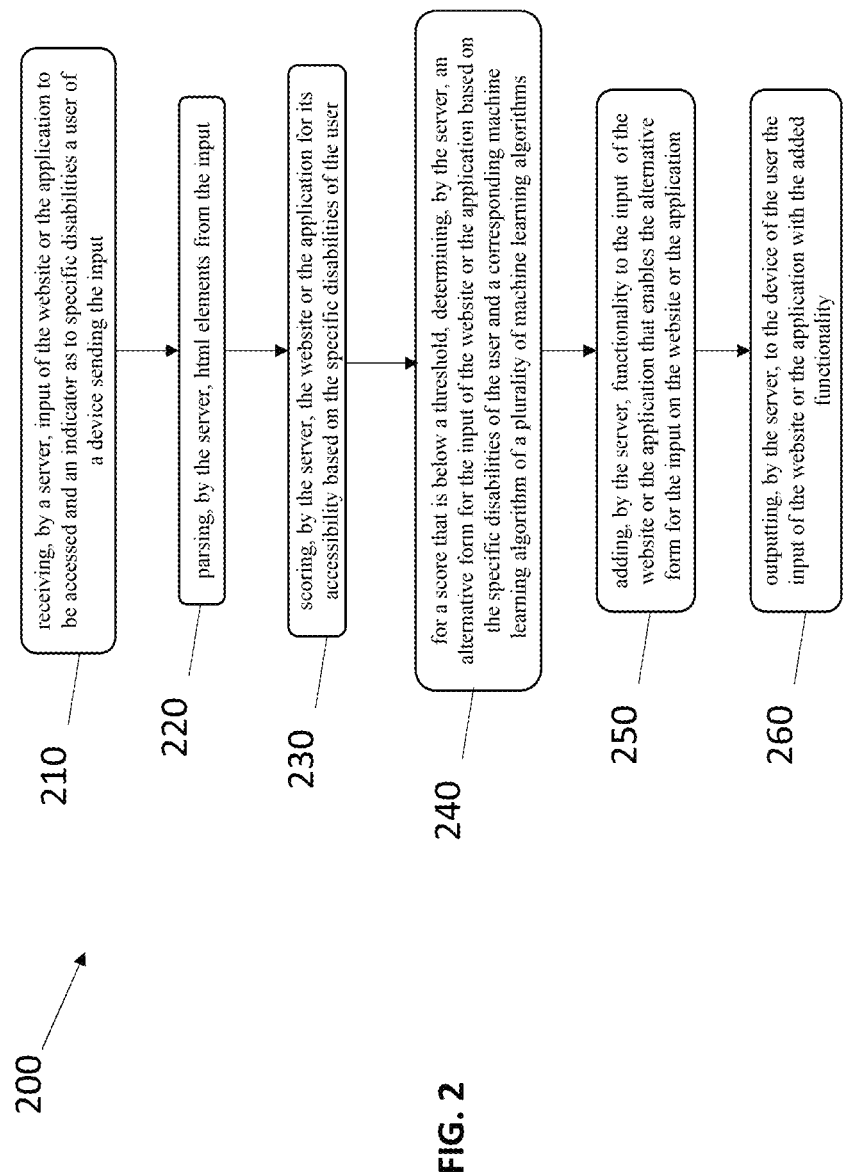
FIG. 2 is a flow chart for creating accessibility of any website or application, according to some embodiments of the invention.

FIG. 2 is a flow chart for creating accessibility of any website or application, according to some embodiments of the invention. The accessibility can be created for people with sight, hearing and/or speech disabilities.

The method can involve receiving, by a server (e.g., a server hosting the web parser 120 as described above in FIG. 1), input of the website or the application (e.g., website and/or application 110 as described above in FIG. 1) to be accessed and an indicator as to specific disabilities a user of a device sending the input (Step 210). The website and/or application can be a website and/or application that the user is attempting to use (e.g., YouTube® or X® formerly known as Twitter) through a computing device. The disability of the user can be input by the user and/or automatically detected based on the user's device (e.g., a device with braille capability can be detected, thus the disability of vision impairment can be automatically determined). In some embodiments, a browser extension is received.

The method can involve parsing, by the server, html elements from the input (Step 220).

The method can involve scoring, by the server, the website or the application for its accessibility based on the specific disabilities of the user (Step 230). The scoring can be based on whether the website or the application has an ability to present its output in a format that is usable to the user based on their particular disability. In some embodiments, the scoring can be based on whether the website of the application has an ability present its output in a format that is usable to the user that has any disability. In some embodiments, the scoring can be low, medium or high. In some embodiments, the scoring can be on a scale from 0 to 100. In some embodiments, the scoring is based on Web Content Accessibility Guidelines (WCAG). In some embodiments, the scoring is based on a WCAG checker tool, as are known in the art. In some embodiments, the scoring is based on ADA compliance.

The method can involve for a score that is below a threshold, determining, by the server, an alternative form for the input of the website or the application based on the specific disabilities of the user and a corresponding machine learning algorithm of a plurality of machine learning algorithms (Step 240). The threshold can be dependent on the type of score. For example, for a low, medium, high score the threshold can be low or medium. For a threshold that is between 0 and 100, the threshold can be any value below 100. The threshold can depend on disability type. For example, the threshold can be higher for someone who is deaf versus someone who is hard of hearing. The threshold can be higher for someone who is blind versus someone who is significantly sign impaired. The threshold can be higher for someone with multiple disabilities.

The corresponding machine learning algorithm can be a machine learning algorithm that corresponds to the specific disabilities of the user. The machine learning algorithm can be selected from one of a plurality of machine learning algorithms.

The machine learning algorithm can convert the website or application input (e.g., text, audio, video, image, and/or links) to a format that that user can use with their specific disability. One machine learning algorithm of the plurality of machine learning algorithms can convert audio to text (e.g., for a user who is hearing impaired), another machine learning algorithm can convert American Sign Language (ASL) to text, and/or another machine learning algorithm can convert an image to text (e.g., for a vision impaired user). As is known to those of ordinary skill in the art, text can be converted to braille for vision impaired users.

In some embodiments, converting ASL to text involves capturing ASL via a camera and mapping sign languages used by the user to the ASL database available to predict which alphabet is being generated through each sign, to collate and form a full sentence. The full sentence can be displayed on the screen in text.

In some embodiments, one or more of the machine learning algorithms are convolutional neural networks that have a number of layers and/or a number of neurons in each layer that is based on a user defined input. For example, the user defined input can be a table.

In some embodiments, for audio to text, the machine learning model can be determined by:

Step 1: collecting 30 minutes to one hour of audio data that is substantially noise free with its transcription. In some embodiments, the audio data can be from an open source platform. In some embodiments, the audio data can be from prior user interactions. The audio data can be preprocessed. In various embodiments, the preprocessing converts the audio data to a 2D Numpy Array or Mel Spectrogram so that, for example, the audio data can be labeled and in a format that a convolutional neural network or deep learning neural network can take as an input.

Step 2: The labeled audio data can be used to retrain the machine learning model. In some embodiments, the machine learning model is a baseline model as provided by Azure Cognitive Speech-to-Text Service.

Step 3: The performance of the retrained machine learning model can be determined by using a Word Error Rate (WER) metric. For example, WER=(incorrect+undetected+substituted)/total words.

Step 4: Steps 1-3 can be repeated until WER is below a predefined threshold.

In some embodiments, for audio to text conversion, an audio file located in the webpage or application is input to a machine learning model (e.g., cloud based Azure Cognitive Service) to generate a transcription.

In some embodiments, for ASL to Text conversion, the machine learning model is trained with ASL letter database of hand gestures. The ASL letter database of hand gestures can include grayscale images with pixel values between 0 and 255 in each image containing 784 pixels. The ASL letter database can be labeled and numerically encoded between 0 and 25 for letters A to Z. In some embodiments, the training set has 27455 data points and the test dataset has 7172 data points.

In some embodiments, for a blind person text can be converted to audio.

In some embodiments, the machine learned models (e.g., CNN or other deep learning models as are known in the art) are trained by grouping the training data into smaller batches for, for example, faster training and/or normalizing the data for faster convergence. For example, assume a training data of 27455 data points, it can be grouped into smaller batches of ~5 k data points per batch for training. In some embodiments, smaller batches allows for reducing a diverse range which can assist in normalization.

In some embodiments, for audio to text, the training data is the audio data as described above. In some embodiments, for ASL to text, the training data is the ASL library as described above. In various embodiments, the training data can be subject to a Label Binarizer and/or One hot encoding.

In some embodiments, for one or more machine learning models that are CNN models, the number of neurons in the layers can be tuned to three successive consecutive convolution layers of filter 5 by 5.

The filter can determine a number of output feature maps. A filter can act as a pattern and will be able to find similarities when convoluted across an image. Increasing the number of filters in the successive layers works well in most cases. In some embodiments, the filter size can be an odd number which can yield a central position.

Dropout acts as a regularize and prevents the model from overfitting. The dropout layer nullifies the contribution of some neurons toward the next layer and leaves others unmodified. The dropout rate determines the probability of a particular neuron's contribution being cancelled.

In some embodiments, once the conversion is performed, scoring is performed again to determine if the conversion improved the accessibility. If the score is higher and above the threshold, then no further conversion is done. If the score remains below the threshold, then the machine learning algorithm can be further trained.

The method can involve adding, by the server, functionality to the input of the website or the application that enables the alternative form for the input on the website or the application (Step 250). In some embodiments, adding functionality to the input of the website can involve adding an extension to the website address to enable the machine learning, scoring and/or interface tools to be accessed.

The method can involve outputting, by the server, to the device of the user the input of the website or the application with the added functionality (Step 260).

Figure 3A:
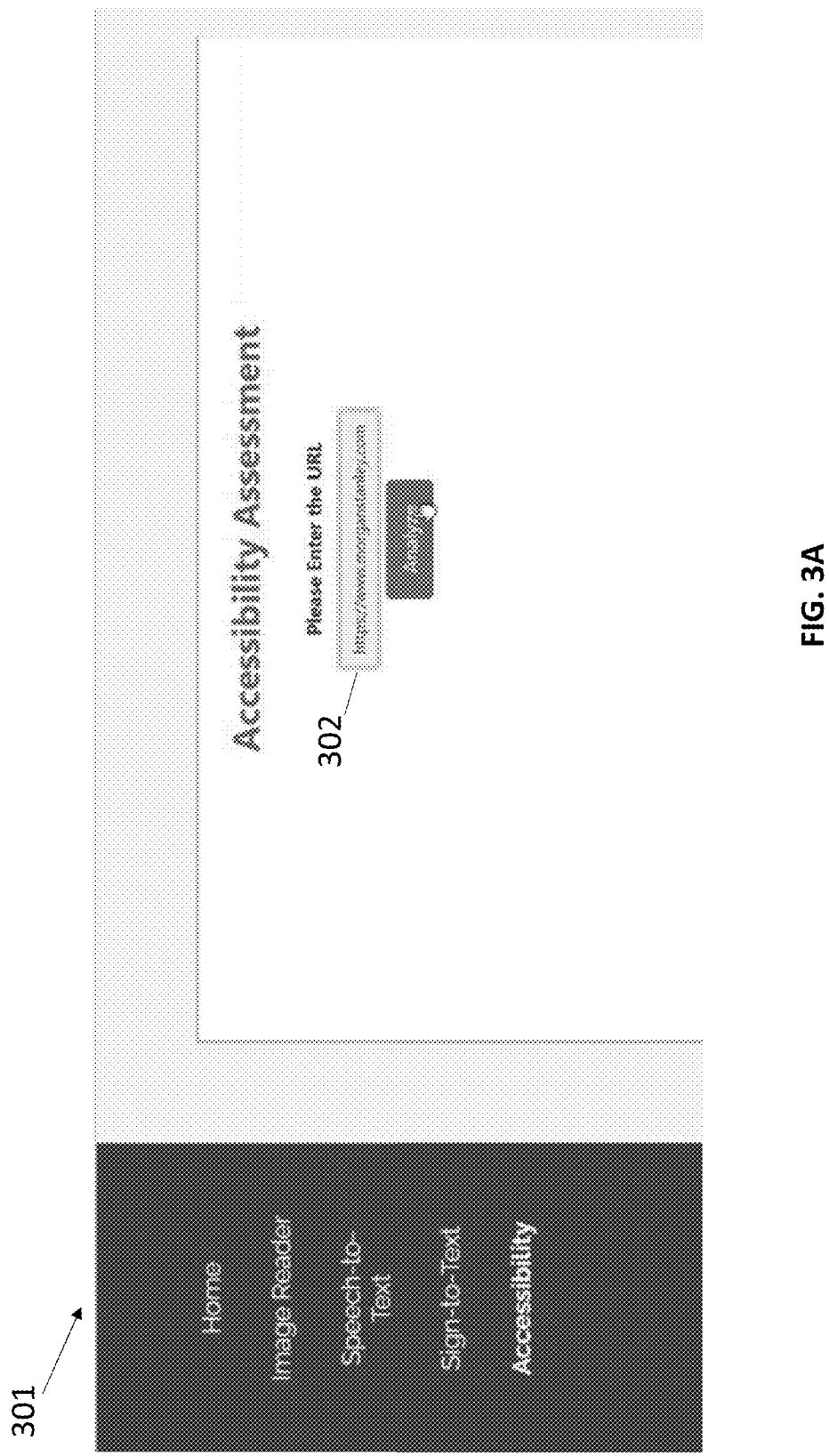
FIG. 3A is a screen shot of a user interface for an accessibility assessment, according to some embodiments of the invention.

FIG. 3A is a screen shot of a user interface 301 for an accessibility assessment, according to some embodiments of the invention. As shown in FIG. 3A, a user can input a URL to be analyzed for accessibility. Upon selecting an analyze button on the user interface, a request can be sent to analyze the URL for accessibility.

Figure 3B:
FIG. 3B is a screen shot of the user interface after the analysis has been performed, showing an example output of the accessibility assessment, according to some embodiments of the invention.

FIG. 3B is a screen shot of the user interface 301 after the analysis has been performed, showing an example output of the accessibility assessment, according to some embodiments of the invention. The output can provide an assessment of accessibility pass or fail of each element on the website.

Figure 3C:
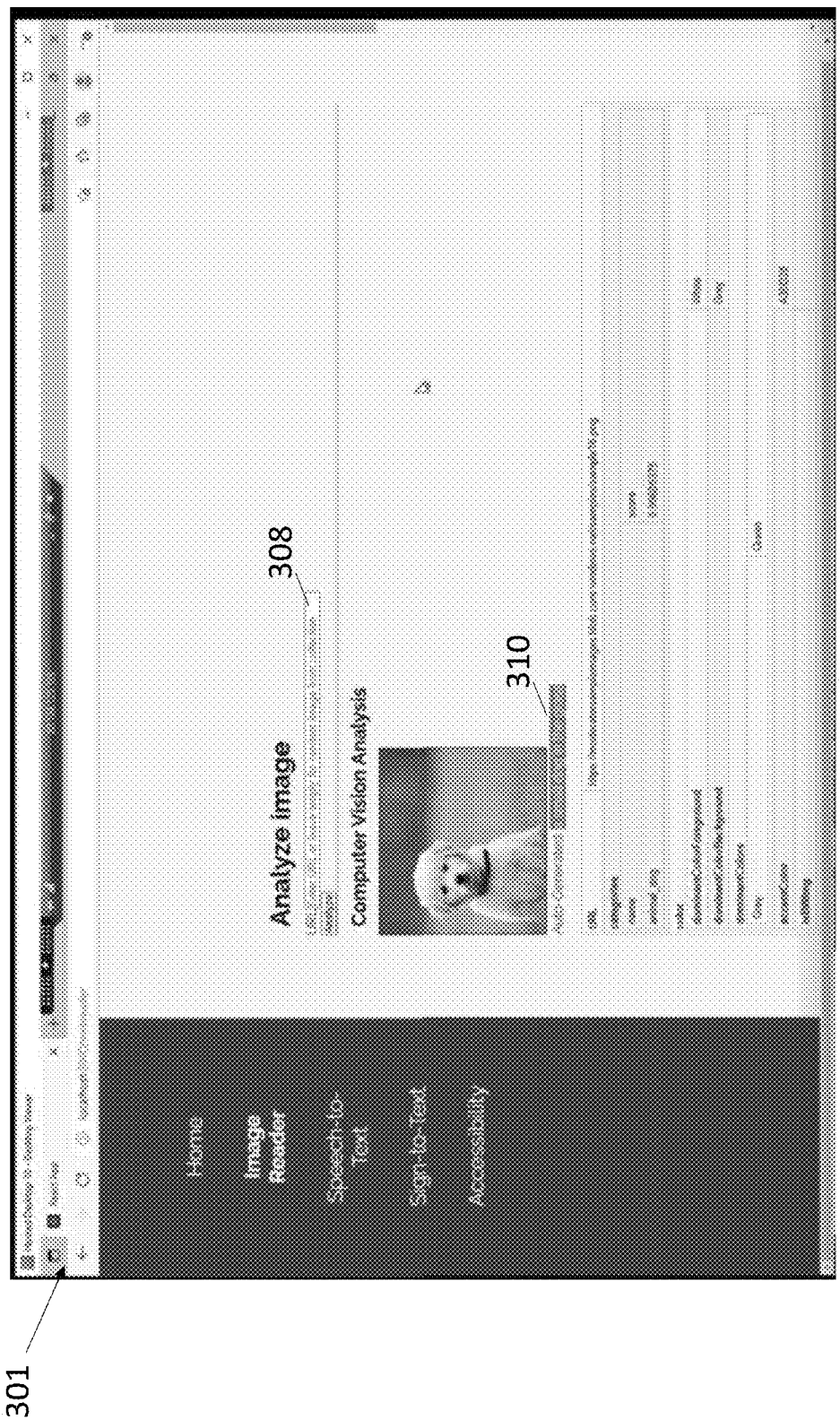
FIG. 3C is a screen shot of the user interface with the image reader selected, showing an example of an image analyzer, according to some embodiments of the invention.

FIG. 3C is a screen shot of the user interface 301 with the image reader selected, showing an example of an image analyzer, according to some embodiments of the invention. A URL containing the image to be analyzed can be entered via the user interface 308, and upon execution, the image analyzer can output the auto-generated text, "a small dog in the grass" 310. One or more data items can be generated as output for the image analyzer, and the output can include confidence scores. Turning to FIG. 3D, FIG. 3D is an example of output including tags, captions, and corresponding confidence scores for the image, according to some embodiments of the invention.

Figure 3E:
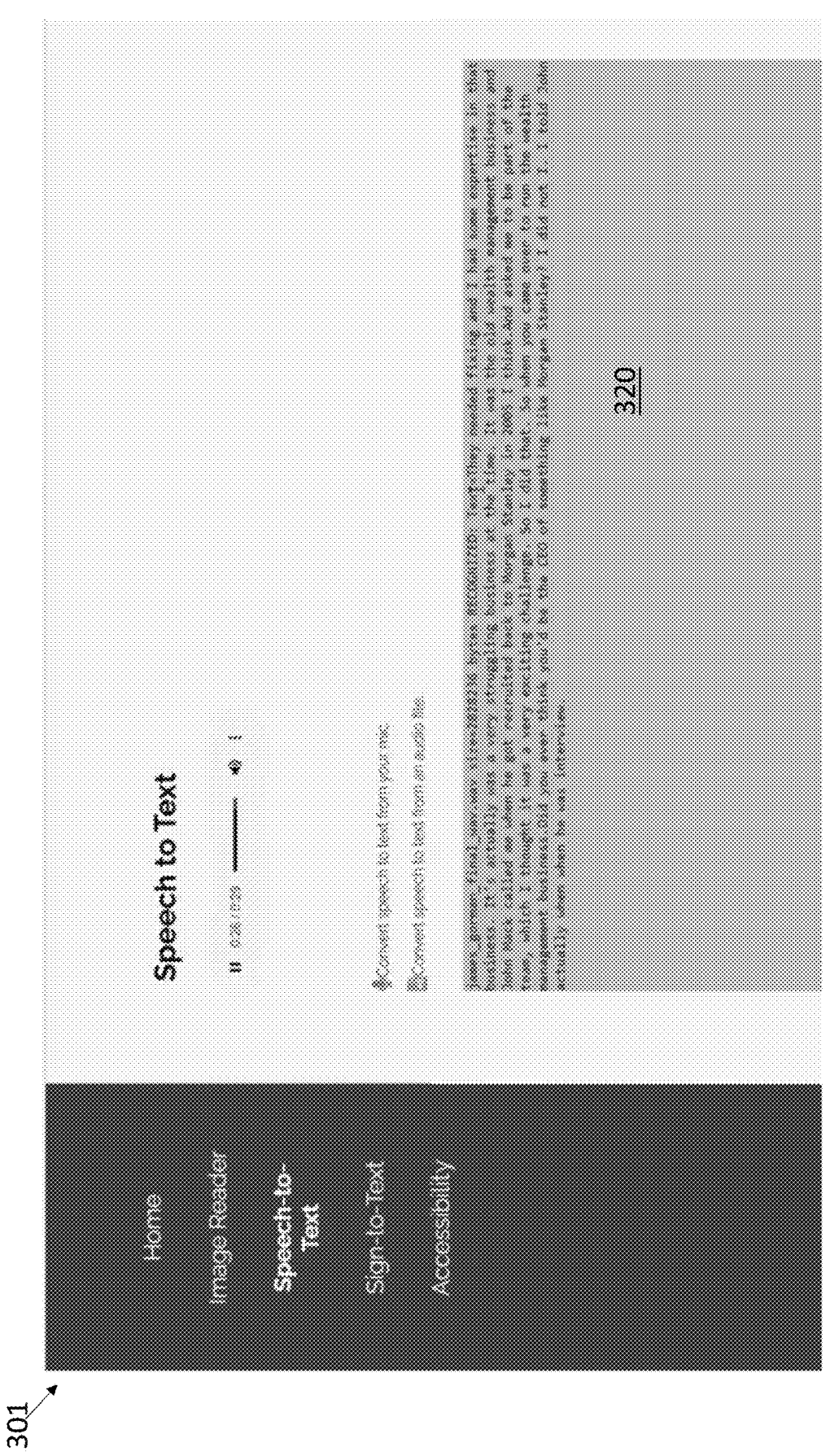
FIG. 3E is a screen shot of the user interface with speech to text selected, and an audio file that has been converted into text, according to some embodiments of the invention.

FIG. 3E is a screen shot of the user interface 301 with speech to text selected, and an audio file that has been converted into text, according to some embodiments of the invention. The audio in the file can be shown as converted to text in area 320.

Figure 3F:
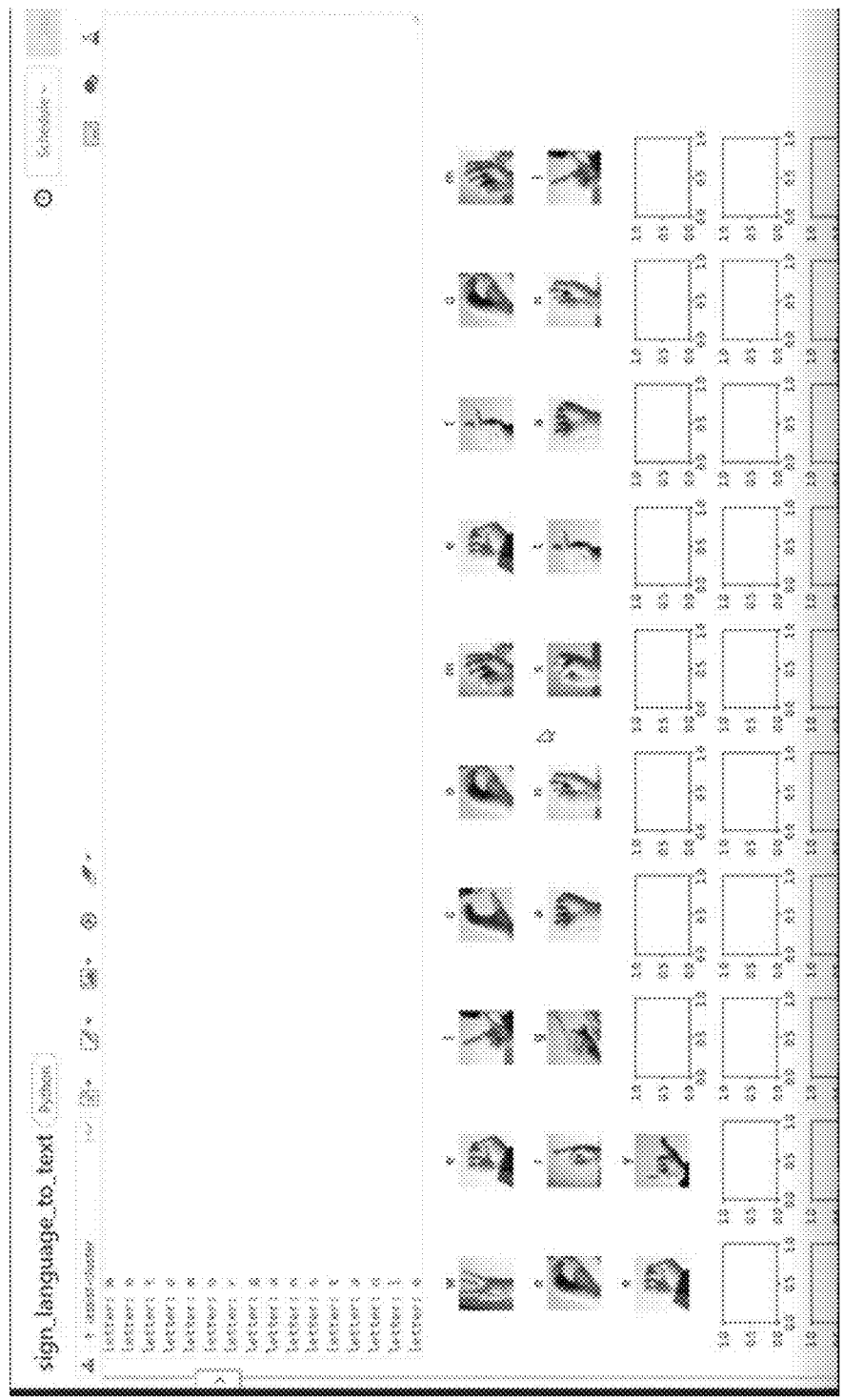
FIG. 3F is an example of sign language as mapped to letters, according to some embodiments of the invention.
Figure 4:
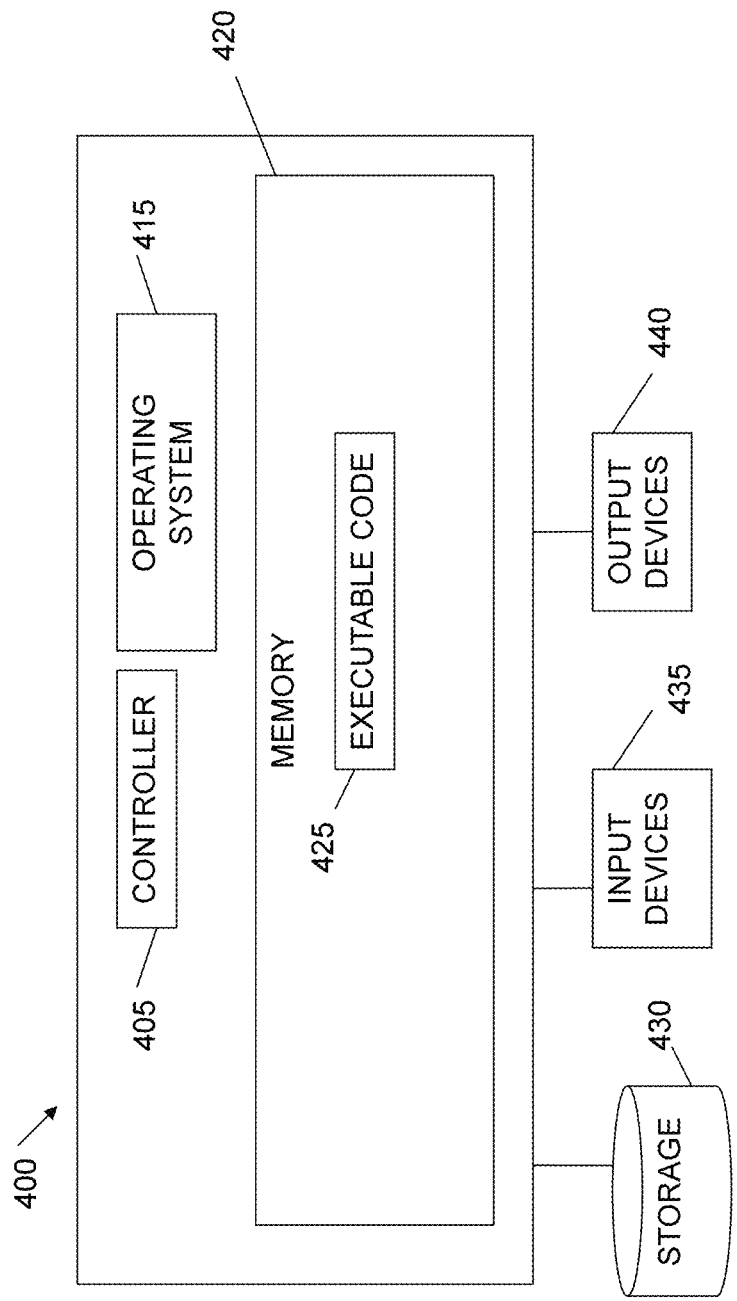
FIG. 4 shows a block diagram of a computing device which can be used with embodiments of the invention.

FIG. 3F is an example of sign language as mapped to letters, according to some embodiments of the invention. FIG. 3G is an example of code used to convert the sign language to text, according to some embodiments of the invention.

creating accessibility of any website or application for people with sight, hearing or speech disabilities FIG. 4 shows a block diagram of a computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g., code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 430 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 4 can be omitted.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In various embodiments, the system is implemented one or more virtual machines. The system (e.g., system of FIG. 1 as described above) and methods (e.g., the methods as described in FIG. 2 as described above), can be implemented on any combination of virtual machines. The virtual machines can be implemented on a computing device as described above in FIG. 4, or any computing device as is known in the art that is suitable for allowing implementation of virtual machines.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

What is claimed is:

1. A method for creating accessibility of any website or application for people with sight, hearing or speech disabilities, the method comprising:

receiving, by a server, input of the website or the application to be accessed and an indicator as to specific disabilities a user of a device sending the input;

parsing, by the server, html elements from the input;

scoring, by the server, the website or the application for its accessibility based on the specific disabilities of the user;

for a score that is below a threshold, determining, by the server, an alternative form for the input of the website or the application based on the specific disabilities of the user and a corresponding machine learning model of a plurality of machine learning models;

adding, by the server, functionality to the input of the website or the application that enables the alternative form for the input on the website or the application;

outputting, by the server, to the device of the user the input of the website or the application with the added functionality; and determining, by the server, a revised score for the website or the application for its accessibility based on the specific disabilities of the user and the alternative form for the input;

and if the revised score is below the threshold, continue to train the corresponding machine learning model, wherein determining the alternative form for the input further comprises converting audio to text, video to text, sign language to text, image to text, or any combination thereof; and wherein converting audio to text comprises:

i) collecting, by the processor, a predetermined duration of audio data having noise below a threshold and a transcript of the audio data;

ii) processing, by the processor, the audio data such that it is in a labeled format;
iii) training, by the processor, one model of the plurality of models with the audio data, wherein the one model is a baseline model;
iv) evaluating, by the processor, the trained one model using a word error rate metric;
v) if the word error rate metric is below a threshold, obtaining a new predetermine duration of audio data having noise below a threshold and a transcript of the audio data and proceeding back to step ii); vi) if the word error rate metric is at or above the threshold, set the model as the model to use for audio to text; and
vii) for any input that is audio, translate the input from audio to text using the model.

2. The method of claim 1 wherein the machine learning model has a number of layers and a number of neurons in each layer that is based on a user defined input, a table input or any combination thereof.

3. The method of claim 1 wherein each of the plurality of machine learning models corresponds to a particular form of input.

4. The method of claim 1 wherein receiving further comprises receiving via a browser extension.

5. The method of claim 1 wherein the scoring further comprises rescoring with the model set as the model to use for audio to text.

6. The method of claim 1 further comprising processing, by the computing device, the audio data into a 2D array and Mel Spectrogram conversion.

7. A system for creating accessibility of any website or application for people with sight, hearing or speech disabilities, the system comprising:
a processor configured to:
receive input of the website or the application to be accessed and an indicator as to specific disabilities a user of a device sending the input;
parse html elements from the input;
score the website or the application for its accessibility based on the specific disabilities of the user;
for a score that is below a threshold, determine an alternative form for the input of the website or the application based on the specific disabilities of the user and a corresponding machine learning model of a plurality of machine learning models;
add functionality to the input of the website or the application that enables the alternative form for the input on the website or the application;
output to the device of the user the input of the website or the application with the added functionality; and
determine a revised score for the website or the application for its accessibility based on the specific disabilities of the user and the alternative form for the input; and if the revised score is below the threshold, continue to train the corresponding machine learning model,
wherein determining the alternative form for the input further comprises converting audio to text, video to text, sign language to text, image to text, or any combination thereof,
wherein converting the audio to text further causes the processor to:
i) collect a predetermined duration of audio data having noise below a threshold and a transcript of the audio data;
ii) process the audio data such that it is in a labeled format;
iii) train one model of the plurality of models with the audio data, wherein the one model is a baseline model;
iv) evaluate the trained one model using a word error rate metric;
v) if the word error rate metric is below a threshold, obtain a new predetermine duration of audio data having noise below a threshold and a transcript of the audio data and proceeding back to step ii);
vi) if the word error rate metric is at or above the threshold, set the model as the model to use for audio to text; and
vii) for any input that is audio, translate the input from audio to text using the model.

8. The system of claim 7 wherein the machine learning model has a number of layers and a number of neurons in each layer that is based on a user defined input, a table input or any combination thereof.

9. The system of claim 7 wherein each of the plurality of machine learning models corresponds to a particular form of input.

10. The system of claim 7 wherein receiving further comprises receiving via a browser extension.

11. The system of claim 7 wherein the scoring further comprises rescoring with the model set as the model to use for audio to text.

12. The system of claim 7 wherein the processor is further configured to process the audio data into a 2D array and Mel Spectrogram conversion.

* * * * *